No. 632,952. Patented Sept. 12, 1899.
A. C. TANNER.
MOTION AND POWER TRANSMITTING MECHANISM.
(Application filed Mar. 16, 1899.)
(No Model.) 2 Sheets—Sheet 2.
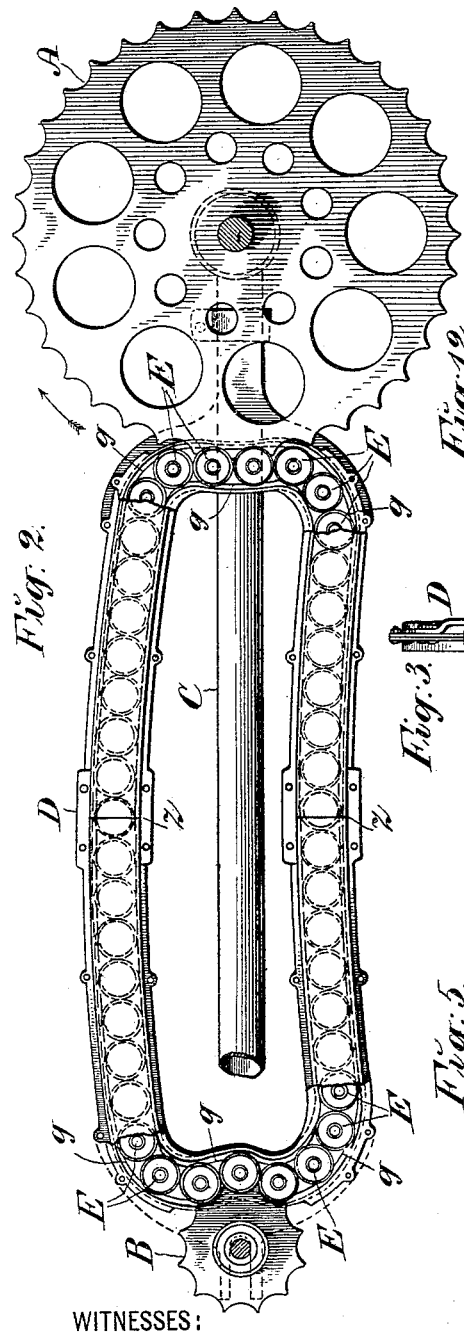
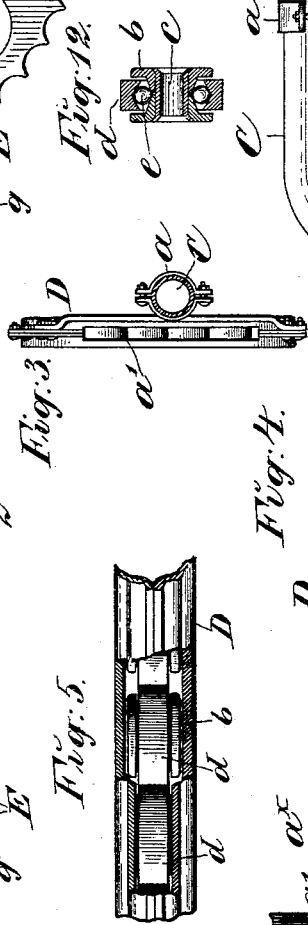
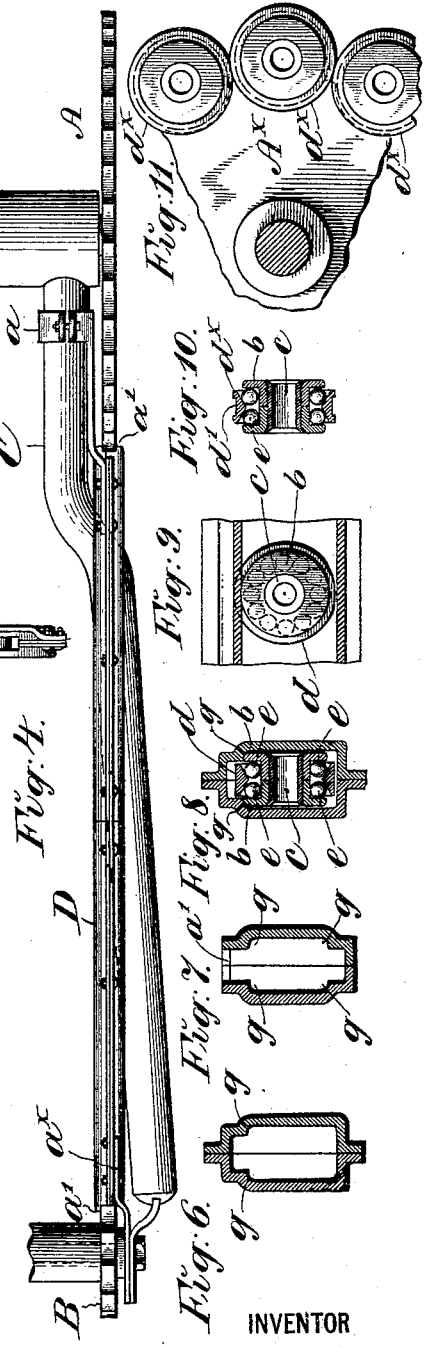
WITNESSES:
INVENTOR
Albert C. Tanner
BY
Henry Connett
ATTORNEY

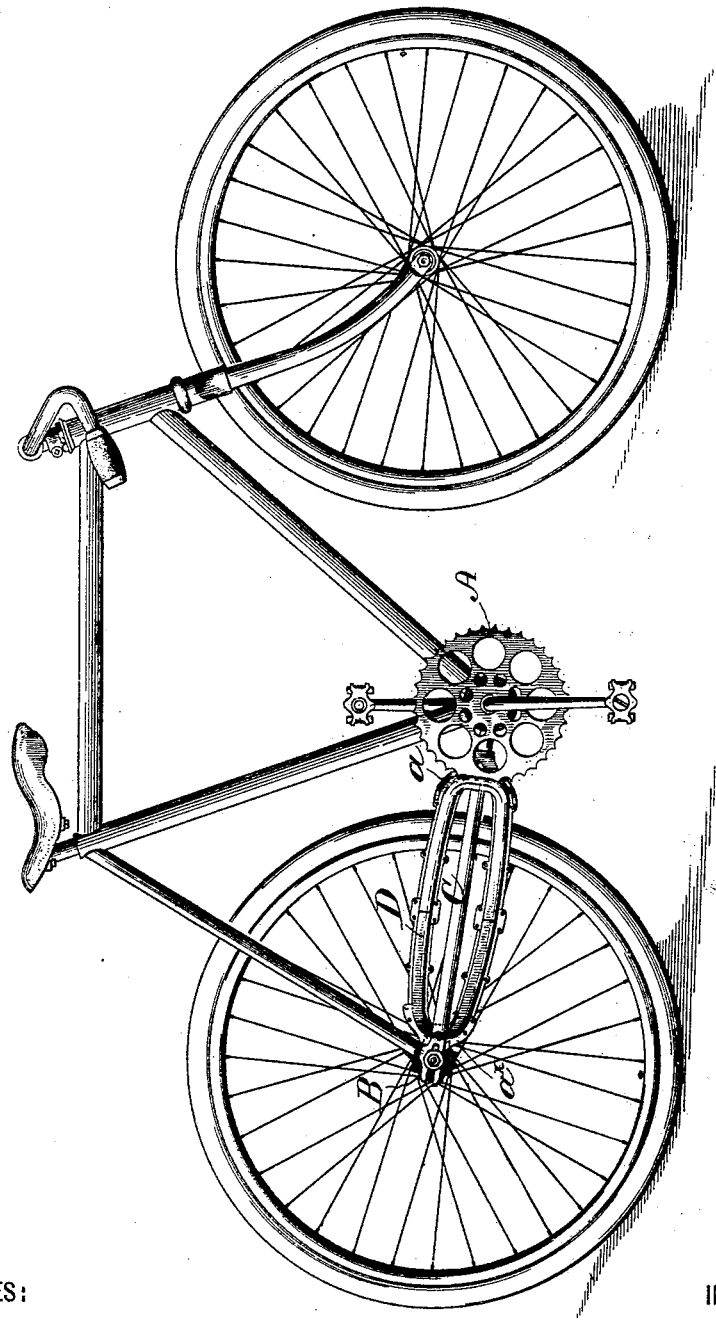

UNITED STATES PATENT OFFICE.

ALBERT C. TANNER, OF JERSEY CITY, NEW JERSEY, ASSIGNOR OF ONE-HALF TO ALMOND W. BARNES, OF NEW YORK, N. Y.

MOTION AND POWER TRANSMITTING MECHANISM.

SPECIFICATION forming part of Letters Patent No. 632,952, dated September 12, 1899.

Application filed March 16, 1899. Serial No. 709,268. (No model.)

*To all whom it may concern:*

Be it known that I, ALBERT C. TANNER, a citizen of the United States, residing in Jersey City, Hudson county, New Jersey, have invented a new and useful Improved Motion and Power Transmitting Mechanism, of which the following is a specification.

This invention relates to the class of mechanical devices for transmitting motion and power through the medium of a series of driving elements incarcerated in an endless trackway; and the object of the invention is to provide such a device or mechanism wherein friction of the parts is reduced to a minimum, noise is eliminated, and the engagement of the driving and driven wheels with the transmitting elements is through non-rolling parts.

The novel features of the mechanism will be hereinafter noted and described.

In the accompanying drawings the invention is represented as constructed and adapted for use on a bicycle or other velocipede to transmit power from the main sprocket-wheel to the lesser rear sprocket-wheel in lieu of a chain.

In the drawings, Figure 1 is a side view, on a relatively small scale, of a bicycle provided with my transmitting mechanism. Fig. 2 is a side elevation of the device, including the sprocket-wheels and a part of the bicycle-frame. In this view parts of the endless track-casing are broken away to show the transmitting elements therein. Fig. 3 is an end view of the device, showing the slot therein for the entry of the sprocket-wheel. Fig. 4 is a plan of the parts seen in Fig. 2. Figs. 5, 6, 7, 8, and 9 are detail views on a larger scale than Figs. 2, 3, and 4. Fig. 5 is a fragmentary plan view showing the casing or trackway broken away in different planes. Fig. 6 is a cross-section of the upper portion of the casing. Fig. 7 is a cross-section of the end portion of the casing at the slot therein. Fig. 8 is a cross-section of the casing and one of the transmitting elements therein; and Fig. 9 is a fragmentary sectional view of the part seen in Fig. 8, the side plate of the casing being broken away. Fig. 10 is a sectional view of one of the transmitting elements provided with a circumferential groove in its driving-disk, and Fig. 11 is a fragmentary view illustrating the engagement of the sprocket-wheel with such grooves. Fig. 12 shows one of the transmitting elements provided with a single set or series of bearing-balls.

A represents the driving sprocket-wheel, B the driven sprocket-wheel, and C a part of the bicycle-frame.

D represents as a whole the endless track-casing, here represented as secured in place on the bicycle-frame by clips $a$ and $a^\times$. In each end of the casing D is a slot-like aperture $a'$ for the entry of a portion of the peripheries of the respective sprocket-wheels.

Motion and power are transmitted from one sprocket-wheel to the other through the medium of a series of driving elements, (designated as a whole by E and best illustrated in detail in Figs. 8 and 9.) Each of these driving elements consists, so far as its operation is concerned, of two track-wheels, connected together by a central or axial tie, and a driving ring, disk, or annulus between said wheels and of somewhat larger diameter than the latter. These connected wheels serve as and constitute a carrier for said disk or annulus, and, as shown, the latter is rotatable independently on a ball-bearing. So far as the preferred construction is concerned the two wheels $b\,b$ are constructed separately (for convenience of assembling) with short bosses and are rigidly connected by a tubular rivet $c$, and the inner face of the driving disk or annulus $d$ is suitably shaped, so as to form seats for bearing-balls $e$, Figs. 8 and 12.

The track-casing D is in the nature of an endless tube provided with suitably-arranged tracks for the wheels of the elements E to roll along. Ordinarily it will have, as shown in Fig. 2, two end portions, an upper longitudinal portion, and a lower longitudinal portion and will also have a transverse joint $z$, whereby it may be shortened for adjustment to the elements E. The preferred specific construction of the track-casing is clearly illustrated. It consists of two substantially like flanged halves, Figs. 6, 7, and 8, in which are formed the tracks $g$ for the wheels $b$ of the elements E. In the upper arched longitudinal portion of the casing these tracks are at the upper side of the casing or along the summit of the arch, which may be bowed in any direction.

In the lower longitudinal portion they are at the lower part, and in the end portions of the casing they will be at the inner side or opposite to the sprocket-wheel or at both the inner and outer sides, as seen in Fig. 7; but in this case the two opposite sets of tracks will be wide enough apart to permit the wheels $b$ to roll on either pair or set of tracks without frictional contact with the other set. The channel between the track-rails will be of such depth that the disks $d$ will be held at all times out of peripheral contact with the track-casing at the channel between the rails. The wheels $b$ are slightly rounded at their outer peripheral angles, as shown, and the tracks $g$ are rounded to fit them. The object of this construction is to keep the element E in the center of the trackway and out of lateral frictional contact with the casing.

As to the general contour of the casing D, Fig. 2, it will be noted that the upper and lower portions are arched or curved upward and that the end portions thereof are curved inward, the centers of the respective end curves coinciding with the centers of the sprocket-wheels, and these end curves are connected with those of the upper and lower longitudinal portions by suitable easing curves. The object of these end curves is in part to enable the elements E, which may be at any time engaged by the sprocket-wheel, to move in a curve substantially concentric with said wheel and in part to put a greater number of the said elements simultaneously into engagement with the teeth of the sprocket-wheel.

In the operation of the mechanism the driving-disks $d$ distance the track-wheels and contact with each other, but have no lateral and no peripheral contact with the track-casing at the channel between the track-rails. They are engaged by the teeth of the sprocket-wheels, the spaces between these teeth being curved, with radii equal or substantially equal to the radii of the said disks, by preference. As the larger driving sprocket-wheel A turns in the direction indicated by the arrow in Fig. 2 and the lesser driven sprocket-wheel B resists this effect to drive it, the power will be communicated directly through the disks $d$ in the upper arched longitudinal portion of the casing, and this series of disks being curved upward the end pressure on the series will hold and press the wheels $b$ of the elements upward against the tracks $g$ in that portion of the track-casing.

In the lower longitudinal portion of the casing, when of the form seen in Fig. 2, under normal conditions the elements E will roll along the tracks $g$ at the lower side thereof; but in back pedaling, where the driving is from the lesser sprocket-wheel and the resistance from the larger sprocket-wheel, the end pressure on the series of elements will cause the latter to be pressed upward and the peripheries of the disks $d$ will be thus brought into frictional contact with the crown of the trackway or casing, whereby a breaking effect is produced. The disks $d$ is all cases prevent peripheral contact between the wheels $b$ of adjacent elements, and they may or may not rotate. They provide non-rolling points of contact for engagement with the teeth of the sprocket-wheels—that is to say, there is no contact of the rolling wheels $b$ with the sprocket-wheels.

In the construction of the driving element illustrated in Figs. 10 and 11 the driving-disk $d^\times$ has a peripheral groove $d'$, which is engaged by the sprocket-wheel $A^\times$. This construction permits the teeth of said wheel to enter more deeply between said disks.

Fig. 12 shows a construction of the driving element wherein only a single series of bearing-balls is employed.

The invention is not limited to any particular general contour of the trackway or casing. If a braking effect is to be produced by back pedaling, then the lower longitudinal portion of the trackway will be arched or curved upward, as represented in Fig. 2; but if this braking effect is not desired then the lower longitudinal portion of the trackway or casing will have a downwardly-curved form, as represented in Fig. 1. If either or both the longitudinal portions of the trackway are made straight or without curvature in either direction, as they may be, both inner and outer pairs of continuous track-rails will be required therein, but of course so separated that the wheels $b$ will not contact at the same time with both pairs. The driving disk or member $d$ of the driving element may be rotatable and circular in form, as shown; but it is non-rolling, properly speaking, as it is not designed to have peripheral contact with the track-casing at any point between the track-rails. The closed character of the track-casing is merely to exclude dust; obviously the tracks $g$ might be exposed so far as the practical operation of the device is concerned.

It will be noted that the endless trackway has a peculiar contour, as shown in Figs. 1 and 2, and in the foregoing description thereof where the rails of said trackway are defined as "curving inwardly" this phrase is intended to mean that the curvature of the rails at the ends of the figure formed by the trackway conforms to the shapes of the driving and driven wheels and will be preferably concentric therewith, and the phrase "curving upwardly" is intended to mean that the upper longitudinal portion of the trackway is arched away from the lower longitudinal portion thereof.

The invention is not limited to the exact construction herein shown, as this may be varied to some extent without departing from the invention essentially.

Having thus described my invention, I claim—

1. A motion and power transmitting mechanism, comprising an endless trackway having suitable track-rails, driving and driven parts, and a series of driving elements on said trackway, each of said elements comprising a carrier, adapted to roll on said track-rails, and a disk, the latter journaled on the carrier and adapted to be engaged by the driving and driven parts.

2. A motion and power transmitting mechanism, comprising an endless trackway having suitable track-rails, driving and driven parts, and a series of driving elements on said trackway, each of said elements comprising a carrier adapted to roll on said track-rails, and a disk, the latter journaled on the carrier and adapted to be engaged by the driving and driven parts, the said track-rails being curved substantially concentric with the driving and driven parts at the points of engagement of the said disks therewith.

3. A motion and power transmitting mechanism, comprising an endless trackway having suitable track-rails, driving and driven parts, and a series of driving elements on said trackway, each of said elements comprising a carrier, adapted to roll on said track-rails, and a disk, the latter journaled on the carrier and adapted to be engaged by the driving and driven parts, the upper longitudinal portion of the trackway being arched.

4. A motion and power transmitting mechanism, comprising an endless trackway having suitable track-rails, driving and driven parts, and a series of driving elements on said trackway, each of said elements comprising a carrier, adapted to roll on said track-rails, and a disk, the latter journaled on the carrier and adapted to be engaged by the driving and driven parts, the said track-rails in the lower longitudinal portion of the trackway being arched.

5. A motion and power transmitting mechanism, comprising an endless track-casing having suitable track-rails, driving and driven parts, and a series of driving elements, each of said driving elements comprising a carrier adapted to roll on said track-rails, and a disk, the latter journaled on, and of greater diameter than the carrier, and said track-casing being provided with a channel between the track-rails, of such depth that the said disk will be held at all times out of peripheral contact with the track-casing.

6. A motion and power transmitting mechanism, comprising an endless trackway having suitable track-rails, driving and driven parts, and a series of driving elements on said trackway, each of said elements comprising a carrier, adapted to roll on said track-rails, and a peripherally-recessed disk, the latter journaled on the carrier and adapted to be engaged by the driving and driven parts.

7. A driving element for a power-transmitting mechanism, comprising suitably-connected track-wheels forming a carrier, and a disk journaled on said carrier, said disk being concentric with and of larger diameter than the said wheels.

8. A driving element for a power-transmitting mechanism, comprising two connected track-wheels, and a disk, the latter situated between, journaled on, and of greater diameter than, said wheels.

9. A driving element for a power-transmitting mechanism, comprising a pair of connected track-wheels, a disk of greater diameter than said wheels and situated between them, and a ball-bearing between said disk and wheels.

10. A driving element for a power-transmitting mechanism, comprising a pair of connected track-wheels, and a disk of greater diameter than said wheels, said disk being situated between the wheels of the pair and rotatable independently thereof, and having in its periphery a circumferential groove, substantially as and for the purpose set forth.

11. The combination with an endless trackway having suitable track-rails, of a driving element having a pair of track-wheels rigidly connected together, a driving-disk of greater diameter than the said wheels and situated between and concentric with the wheels of the pair, and the bearing-balls within the disk, said disk having a circumferential groove for engagement by the driving sprocket-wheel, substantially as set forth.

In witness whereof I have hereunto signed my name, this 15th day of March, 1899, in the presence of two subscribing witnesses.

ALBERT C. TANNER.

Witnesses:
HENRY CONNETT,
PETER A. ROSS.